United States Patent
Kane

(10) Patent No.: US 9,607,152 B1
(45) Date of Patent: Mar. 28, 2017

(54) DETECT ENCRYPTED PROGRAM BASED ON CPU STATISTICS

(71) Applicant: SYMANTEC Corporation, Mountain View, CA (US)

(72) Inventor: David Kane, Los Angeles, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 14/717,939

(22) Filed: May 20, 2015

(51) Int. Cl.
| | | |
|---|---|---|
| *G06F 21/00* | (2013.01) | |
| *G06F 21/56* | (2013.01) | |
| *G06F 11/00* | (2006.01) | |
| *G06F 12/14* | (2006.01) | |
| *G06F 12/16* | (2006.01) | |
| *G08B 23/00* | (2006.01) | |

(52) U.S. Cl.
CPC .......... *G06F 21/566* (2013.01); *G06F 21/567* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2007/0067840 A1* | 3/2007 | Young | .................. | G06F 21/554 726/22 |
| 2008/0016568 A1* | 1/2008 | Szor | ...................... | G06F 21/564 726/22 |
| 2009/0165131 A1* | 6/2009 | Treadwell | ............. | G06F 21/566 726/22 |
| 2011/0219449 A1* | 9/2011 | St. Neitzel | ............. | G06F 11/00 726/23 |
| 2014/0095883 A1* | 4/2014 | Kirillov | ................ | H04L 9/3281 713/176 |
| 2015/0227742 A1* | 8/2015 | Pereira | .................... | G06F 21/56 726/24 |
| 2016/0085968 A1* | 3/2016 | Jakobsson | ............. | G06F 21/563 726/23 |

* cited by examiner

*Primary Examiner* — Shin-Hon Chen
(74) *Attorney, Agent, or Firm* — Patterson + Sheridan, LLP

(57) ABSTRACT

Techniques are presented for detecting malware in an executable. The method includes receiving an executable to evaluate for malware, emulating an execution of the executable up to a first count of instructions, determining a number of cache misses that occur while emulating the executable up to the first count of instructions, comparing the number of cache misses to a threshold, and upon determining the number of cache misses exceeds the threshold, identifying the executable as potentially containing malware.

20 Claims, 7 Drawing Sheets

DETECT ENCRYPTED PROGRAM BASED ON CPU STATISTICS

BACKGROUND

Field

The present disclosure generally relates to techniques for detecting malware in an executable. More specifically, embodiments presented herein provide techniques for detecting malware in a packed executable containing junk instructions used to disguise the detection of the packed executable.

Description of Related Art

Computer systems are continually threatened by attacks from malicious computer code or malware. Malware generally refers to applications installed on a computer without a user's knowledge or without a user's consent, such as a virus, a worm, or a Trojan. Antivirus prevention and detection software installed on computers can attempt to prevent malicious code attacks and to detect the presence of malicious code. However, as malware evolves, the antivirus software too has to evolve to keep up with the latest malware.

Signature-based malware detection methods face a problem with an antivirus detection evasion tool called a "packer." A packer is a software application, which takes an existing piece of malware and hides or "packs" it to make it no longer detectable to most signature-based systems. A packer can change the byte-level representations of a binary program without modifying its execution semantics. Because signatures used in anti-virus scanning engines are typically derived from the byte-level representations of malware samples, malware writers use packers to hide the malware. Even worse, malware writers can also apply different packers in different combinations to create a large number of variants of existing malware that can easily evade signature-based anti-virus scanners.

Traditionally, anti-virus companies have attempted to manage the packer problem by unpacking packed binaries and scanning the unpacked data. Typically, well-packed data has high entropy relative to normal code. Static scanners can usually detect an encrypted program based on the entropy of the code section. Newer packers insert junk instructions in their code stream to make the entropy look more normal. Thus, the junk instructions will not trigger traditional quick encryption detection methods.

Junk instructions make unpacking the packed executable more difficult. It is harder to discriminate junk instructions from others. Malware authors rely on the scanning tool trying to unpack the packed executable with the junk instructions before malware is detected.

SUMMARY

In one embodiment, a method for detecting malware in an executable is disclosed herein. The method includes receiving an executable to evaluate for malware, emulating an execution of the executable up to a first count of instructions, determining a number of cache misses that occur while emulating the executable up to the first count of instructions, comparing the number of cache misses to a threshold, and upon determining the number of cache misses exceeds the threshold, identifying the executable as potentially containing malware.

In another embodiment, a computing device is disclosed herein. The computing device includes a processor and a memory storing programming code. When the program code is executed on the processor, the program code performs an operation for detecting malware in a packed executable. The operation includes receiving an executable to evaluate for malware, emulating an execution of the executable up to a first count of instructions, determining a number of cache misses that occur while emulating the executable up to the first count of instructions, comparing the number of cache misses to a threshold, and upon determining the number of cache misses exceeds the threshold, identifying the executable as potentially containing malware.

In another embodiment, a nontransitory computer readable medium is disclosed herein. The nontransitory computer readable medium has stored thereon instructions that when executed by a processor cause the processor to perform a method for detecting malware in a packed executable. The method includes receiving an executable to evaluate for malware, emulating an execution of the executable up to a first count of instructions, determining a number of cache misses that occur while emulating the executable up to the first count of instructions, comparing the number of cache misses to a threshold, and upon determining the number of cache misses exceeds the threshold, identifying the executable as potentially containing malware.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Embodiments presented herein provide techniques for detecting whether a packed executable containing junk instructions contains malware. In one embodiment, a detection component on a computing network. The detection component uses a CPU cache to discriminate between packed executable containing junk instructions and executables that are not packed. To do so, the detection component emulates an execution of an executable and uses the CPU cache to see the number of cache misses counted during emulation. The detection component compares the number of cache misses counted during emulation to a threshold.

The detection component determines the threshold by emulating an execution of a known packed executable containing junk instructions. During emulation, the CPU cache counts the number of cache misses. The detection component then emulates the execution of a known executable that does not contain junk instructions. During emulation, the CPU cache counts the number of cache misses. The detection component determines the predetermined threshold by comparing the number of cache misses counted for the known packed executable containing junk instructions to the executable that does not contain junk instructions. The predetermined threshold is compared to the number of cache misses the CPU cache counts during emulation of the execution of an unknown executable.

For example, if the detection component partially emulates the execution of an unknown executable and the executable is within range of the predetermined threshold, then that executable may be flagged as potentially containing malware. The executions of the executables that are marked as potentially containing malware may be emulated further by the detection component to confirm any malware present in the executable. For example, while the detection component emulates the execution of the flagged executable, a scanner may scan the executable for malware signature definitions. If the scanner finds a malware signature definition, then the executable is marked as containing malware.

Figure 1:
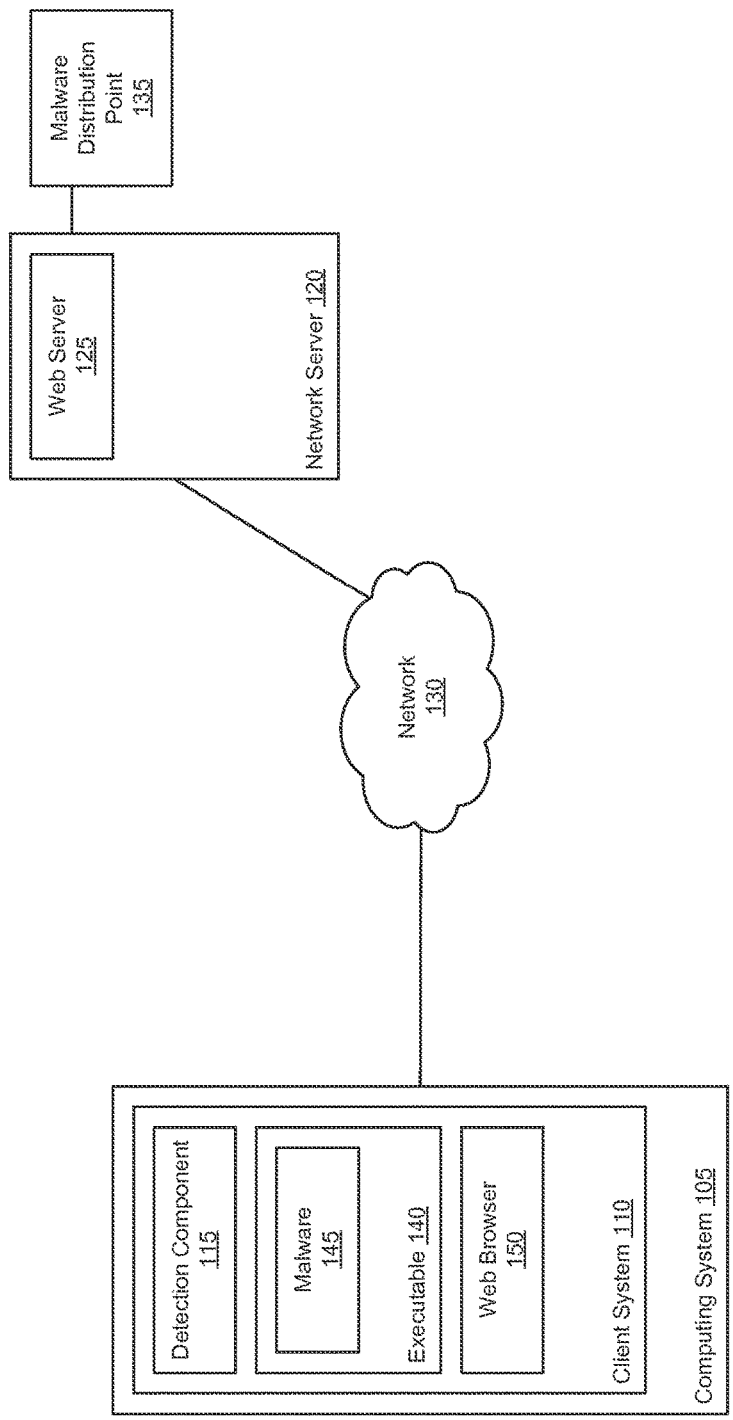
FIG. 1 illustrates an example computing environment, according to one embodiment.

FIG. 1 illustrates an example computing environment 100, according to one embodiment. For example, the computing environment 100 includes a computing system 105 and a network server 120 having a web server 125. Illustratively, the computing system 105 includes a client system 110. Computing system 105 connects the detection component to the client systems 110, and connects these computing systems to external networks using any combination of wired and wireless network segments and includes an appropriate combination network switching and routing devices. The client system 110 is included to be representative of physical computing systems, as well as virtual machine instances deployed to a computing cloud. The computing system 105 may be connected to a network 130.

As shown, the client system 110 includes a web browser 150 and a detection component 115 generally configured to scan files and memory on client 110 for the presence of malicious software, as well as scan files received over a network to prevent malicious software from being installed. To do so, the detection component 115 may scan the files with a fingerprint scanner and compare those files with a set of malware definitions. When a match is found, the detection component 115 may take actions to remove files from the client system, alert a user to the presence of malware, or block actions from occurring (e.g., prevent a user from executing an application that will install malware on client system 110).

As noted above, the signature or definitions used by the detection component 115 deployed in computing system 105 needs to be regularly updated to be effective. Further, a common practice for malware components that do "get past" these (or other) security applications is to begin to modify or disable features of the security applications after being installed on a computing system. For example, a malware component may modify an in-memory instance of an executable on disk to change how updates are applied, change what responses are for detecting something that matches the signature of a given security application.

For example, the network server 120 may be a compromised server, resulting in the network server behaving as a malware distribution point 135. If a user downloads and runs a packed executable 140 from the compromised server without having the detection component 115 scan the executable, then any malware 145 contained in the packed executable 140 may store itself into the client system 110. Instead, the detection component 115 may scan the packed executable 140 downloaded from the compromised network server 120 and take actions to remove the files from the client system 110. An example of such an executable downloaded from a compromised server is a packed program containing malware.

A "packer" is a program that can compress or encrypt an input executable (e.g., a binary file). As an example of a typical packing process, a packer P reads in the byte sequence of the packing input binary O and compresses or encrypts this byte sequence into another byte sequence of the input binary O', and adds an unpacker routine U to O' to form the final packer output, P(O). When P(O) runs, the program's control first goes to the unpacker routine U. If anti-virus scanning is performed on P(O) at this point, the scan will not detect the underlying malware program as it is disguised by the packer. The unpacker routine U decompresses/decrypts O' and restores the original program O in memory. Then, control is transferred to the main entry point of O as if the unpacking process never took place. Because P(O) is substantially different from O, the byte-level signature for O is not applicable to P(O). The anti-virus engine fails to detect P(O) as malware, even if it behaves the same as O. Once the unpacking occurs, the execution of malware O can occur without detection as any anti-virus scan that might have occurred would have occurred upon initial execution of P(O) and so would have already missed the malware. Malware writers can pack a piece of malware O with different packers and generate different variants, such as P1(O), P2(O), etc. In addition, they can apply packing multiple times to a malware O and generate such variants as P1(P2(O)), P2(P1(O)), etc. By applying multi-layer packing, even with a small number of packers, malware writers can easily generate a large number of variants from the same malware.

Figure 2:
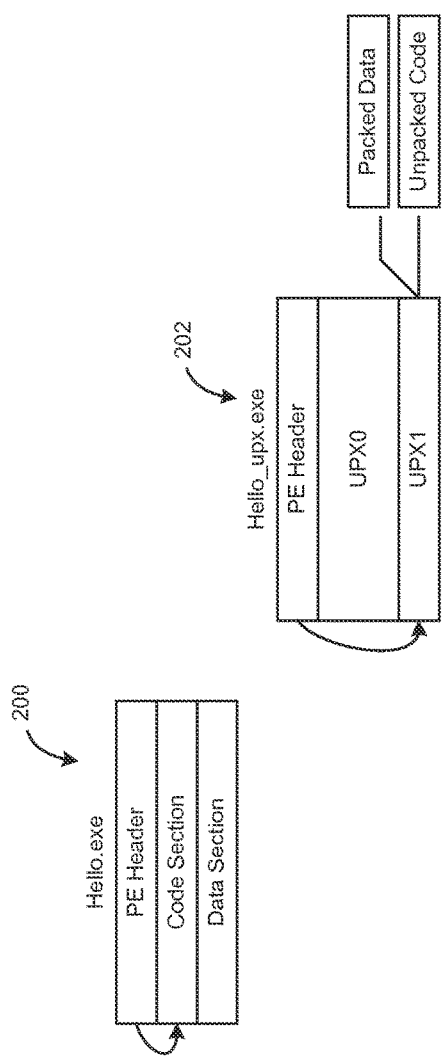
FIG. 2 is a block diagram illustrating a processing system according to one embodiment.

FIG. 2 illustrates an executable program (Hello.exe 200) and a version of this executable packed by a common packer UPX (Hello_upx.exe 202). The Hello.exe 200 shows the standard portable executable (PE) header, code section, and data section that can be found in an executable program. The memory range of Hello.exe's 200 code and data sections is reserved as section UPX0 in the packed version, Hello_upx.exe 202. Data in Hello.exe's 200 code section and data section are compressed and stored in UPX1 as packed data 204. Code to unpack the packed executable 202 is added in UPX1. The unpacking code 206 is executed to restore Hello.exe's 200 code and data section to UPX0 from the packed data 204 in UPX1. The entry point of Hello.upx.exe 202 is modified to point to the unpacker code 206, and so the first action will be to unpack the program and restore the original binary in memory. Control is then transferred to the original binary. The original malware is completely unpacked before control is transferred to the original binary. Unpacking and execution are not interleaved and code pages stay in plaintext form simultaneously. The malware's post-load address space image remains the same.

When a packed binary P(O) 202 runs, its unpacker routine restores the original program being packed, O 200, in memory. In one embodiment, the detection component 115 accurately catches when the unpacker routine restores the original program being packed in memory, and invokes the anti-virus scanner at that point so that that a scanner in the detection component 115 can be applied to P(O) as effectively as to O. In addition, the system can catch this unpacking moment in a way that is independent of the packing algorithms used in packers to this approach can be applied to P(O) regardless of the underlying packing techniques used in P.

As noted, a measure of entropy is a reliable statistic for determining whether an executable file has been processed with a packer. The degree of compression of an executable corresponds to redundancy or predictability. In the case of a packed executable with a low degree of predictability, the packed executable will reflect high entropy. The property of a packed executable lends itself to a method for determining whether an executable is packed is by measuring the executable's level of entropy.

Malware authors have recognized this being used to determine whether an executable is packed. To bypass the entropy measuring method, some packers insert junk instructions in a code stream to create additional entropy in the packed executable. Junk instructions may include instructions that compute values that are never used in an executable, loops that execute but do not change data of an application. Because inserting junk instructions in the code stream alters the level of entropy to normalize the code, the packed executable (with junk instructions) may not be identified by using measuring an executable's level of entropy.

In addition to normalizing an executable's level of entropy, junk instructions make unpacking a packed executable more difficult. With junk instructions, it is more difficult to discriminate among those parts of code that are junk and those parts of code that are not junk. The hacker's hope is that the detection component 115 will give up trying to unpack the packed executable containing the junk instructions before the malware is detected. To discriminate between packed executables that include junk instructions and those executables that are not packed, the detection module evaluates the CPU cache during emulation of the executable.

Figure 3:
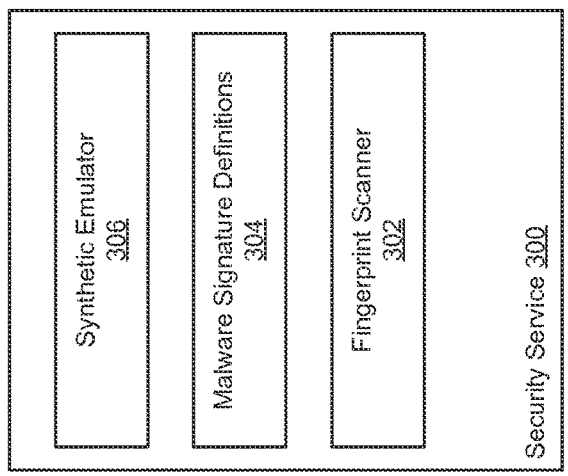
FIG. 3 illustrates an example security service configured to detect compromised security applications, according to one embodiment.

FIG. 3 illustrates an example detection component 300 configured to detect compromised applications, such as the detection component 115 in the client system 110, according to one embodiment. The security service generally 300 corresponds to software applications and components installed as part of a management system in an enterprise computing environment. As shown, the detection component 300 includes a fingerprint scanner 302, a set of malware signature definitions 304, and a synthetic emulator 306.

The synthetic emulator 306 emulates an execution of an executable without storing the executable in memory directly. The synthetic emulator 306 executes files in a fully contained virtual environment. The virtual memory is independent of the memory in the host computer system. In this way, the synthetic emulator is isolated from the actual hardware devices so that no harm can be done by executing a virus being emulated.

The malware signature definitions 304 generally correspond to information used by a given security application to detect the presence of malware components or other malicious code or date. For example, a malware signature definition 304 may specify attributes used by an antivirus application to identify content in an executable file that is a virus.

The fingerprint scanner 302 generally corresponds to representations of a file. A fingerprint is generated in a manner such that the fingerprint uniquely identifies the file. To scan for malware, the fingerprint scanner 302 tests fingerprints created for the file and compares the retrieved fingerprints to store malware signature definitions 304. Each malware signature definition 304 describes a known type of malware. If a fingerprint matches a signature it signifies that the file is infected with the malware described by the malware signature definition 304. In response to determining that the file is infected by malware, the fingerprint scanner 302 remediates the file. By using multiple fingerprints associated with the file to scan the file for malware, the malware can be detected by the fingerprint scanner 302 using a signature even if the malware has mutated to a state where it no longer corresponds to the signature. A fingerprint can detect mutated malware because the malware's signature may still correspond to one of the file's fingerprints. If it is determined that the file is infected with malware, the fingerprint scanner 302 transmits fingerprints of the file to the CPU for analysis of the malware and its mutations.

To determine whether an executable is packed, security systems measured the level of entropy of an executable. A high level of entropy meant generally indicates that an executable is packed. However, malware authors have used junk instructions into the code stream to normalize the level of entropy. Thus, measuring the level of entropy of an executable is no longer a reliable method for determining whether an executable is packed.

When emulating the execution of a packed executable having junk instructions, emulating through the junk instructions has a negative impact on a computer's CPU cache. Recall from above, if a processor finds a memory location that is in the cache, a cache hit has occurred. However, if the processor does not find the memory location in the cache, a cache miss occurs. Junk instructions typically are pieces of code with no other function other than altering the appearance of the executable. Junk instructions are instructions that compute values that are never used in the executable. Thus, when a processor executes junk instructions in an executable, cache misses occur because the CPU is anticipating an event that has no function.

In one embodiment, the detection module determines whether a packed executable contains junk instructions is by emulating the execution of the executable and counting the number of cache misses during emulation. A packed executable containing junk instructions is expected to significantly increase in the number of cache misses counted compared to a normal executable.

Figure 4:
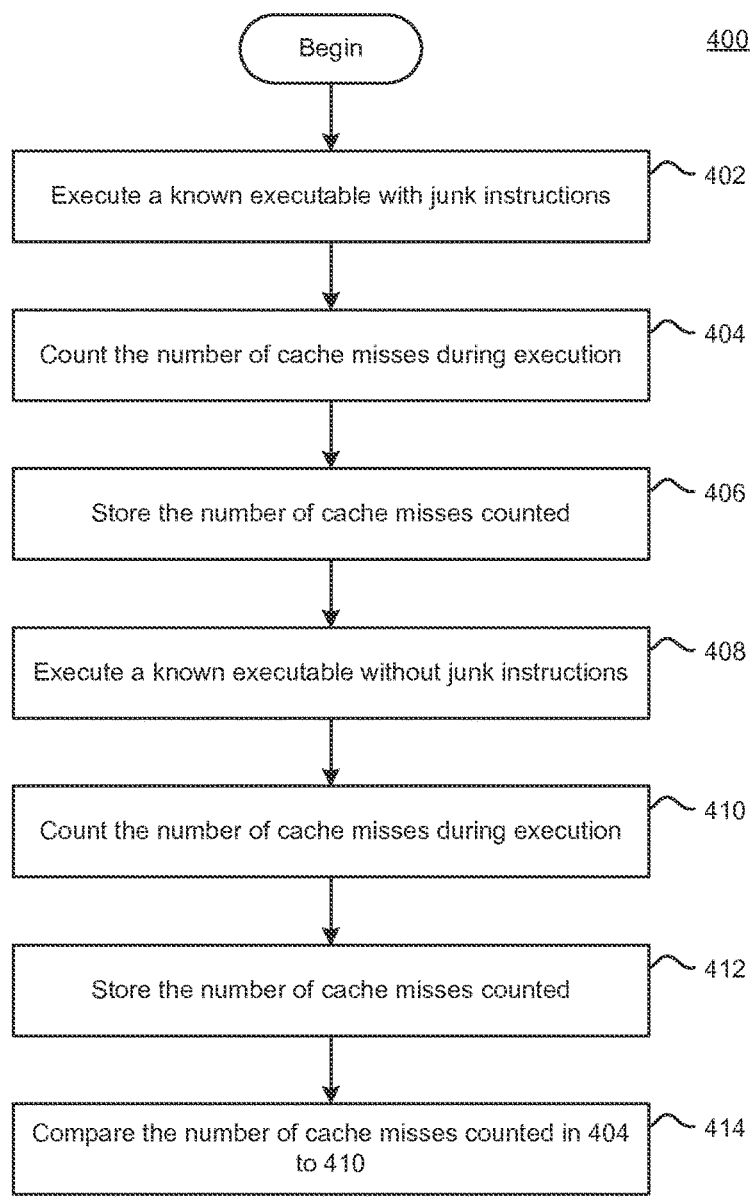
FIG. 4 illustrates a method for determining a threshold for the number of cache misses counted during emulation, according to one embodiment.

FIG. 4 illustrates a method for determining a desired threshold of cache misses in an executable compared to an executable containing junk instructions. As shown, the method 400 begins at step 402, where the detection component 300 emulates an execution of a known executable with junk instructions. As the execution of the executable is emulated, the CPU cache counts the number of cache misses, at step 404. At step 406, the number of cache misses stored in memory. At step 408, the execution of an executable, which does not include junk instructions, is emulated. As the execution of the executable is emulated, the CPU cache is counting the number of cache misses, at step 410. At step 412, the number of cache misses counted is stored in memory. The number of cache misses counted for the executable containing junk instructions is compared to the number of cache misses counted for the executable not containing junk instructions at step 414. The difference determined at step 414 is a threshold for cache misses between an executable containing junk instructions and an executable not containing junk instructions.

Figure 5:
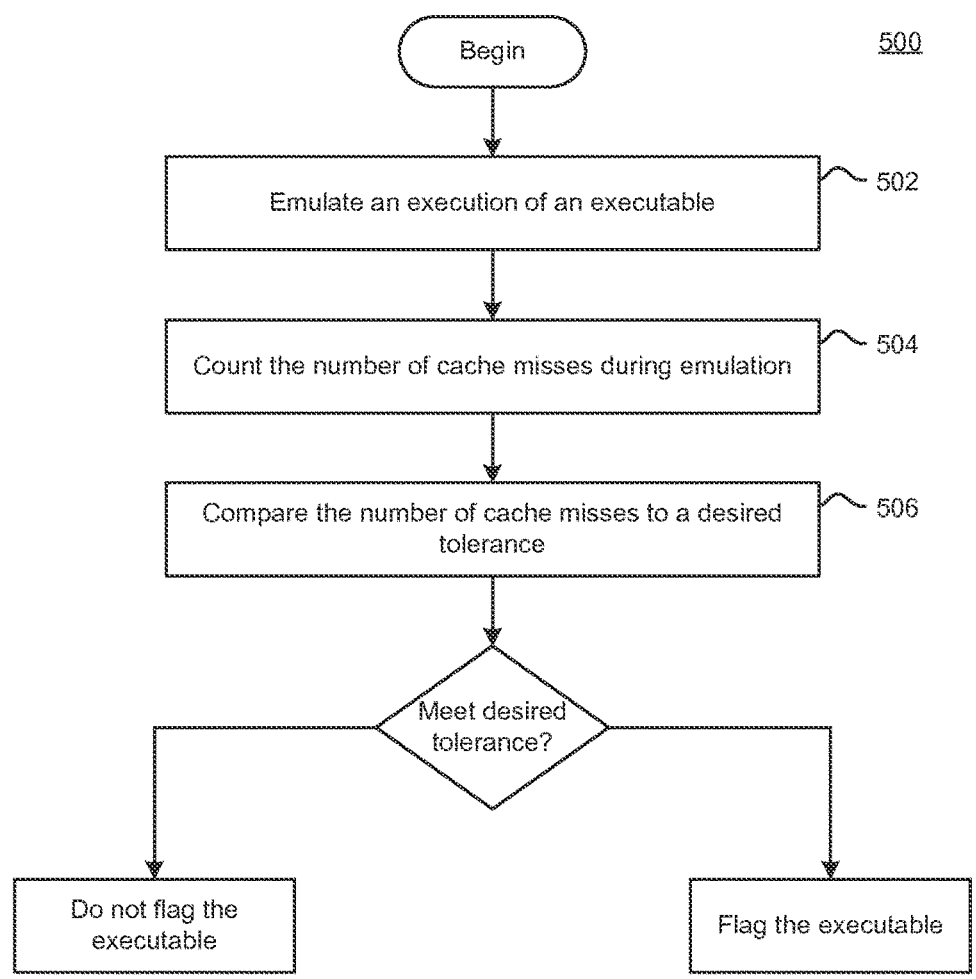
FIG. 5 illustrates a method for flagging executables as potentially containing malware, according to one embodiment.

FIG. 5 illustrates a method 500 for gathering data for the system scanner. As shown, the method 500 begins at step 502 where the detection module emulates the execution of an executable up to a first count of instructions. (Note here that the executable is being evaluated by the something to see if it includes malware). In one embodiment, the execution of the executable is emulated up to a first count of instructions in the synthetic emulator in the system scanner. The execution of the executable is only partially emulated up to the first count of instructions. Partially emulating the execution of the executable increases the performance regulations of the anti-virus method. For example, emulating through all the junk instructions could result in an executable that takes too long to emulate because the emulator must process various instructions that are not needed. For example, emulating through all the junk instructions may result in the emulator emulating a continuous loop. In another embodiment, the executable may be executed on the CPU. The execution is monitored before any malware in the executable can store itself in memory.

At step 504, the CPU cache counts the number of cache misses during the emulation up to the first count of instructions. In another embodiment, the CPU may count the number of cache misses up to the first count of instructions using a program configured to track the number of cache misses during emulation.

At step 506, the number of cache misses counted at step 504 is compared to the threshold. Whether the number of cache misses exceeds the desired tolerance is determined at step 508. If the number of cache misses counted at step 504 exceeds the threshold, then the executable is flagged as potentially containing malware at step 510. If the number of cache misses counted at step 504 does not exceed the desired threshold, then that executable is not flagged at step 512. To increase the rate of the system scanner, the system scanner first emulates the execution of each executable and counts the number of cache misses during execution. The executables that are flagged as potentially containing malware will receive a further scan. Those executables that are not flagged as potentially containing malware do not have to be scanned any further. Thus, method 500 decreases the amount of work that the system scanner needs to do.

Figure 6:
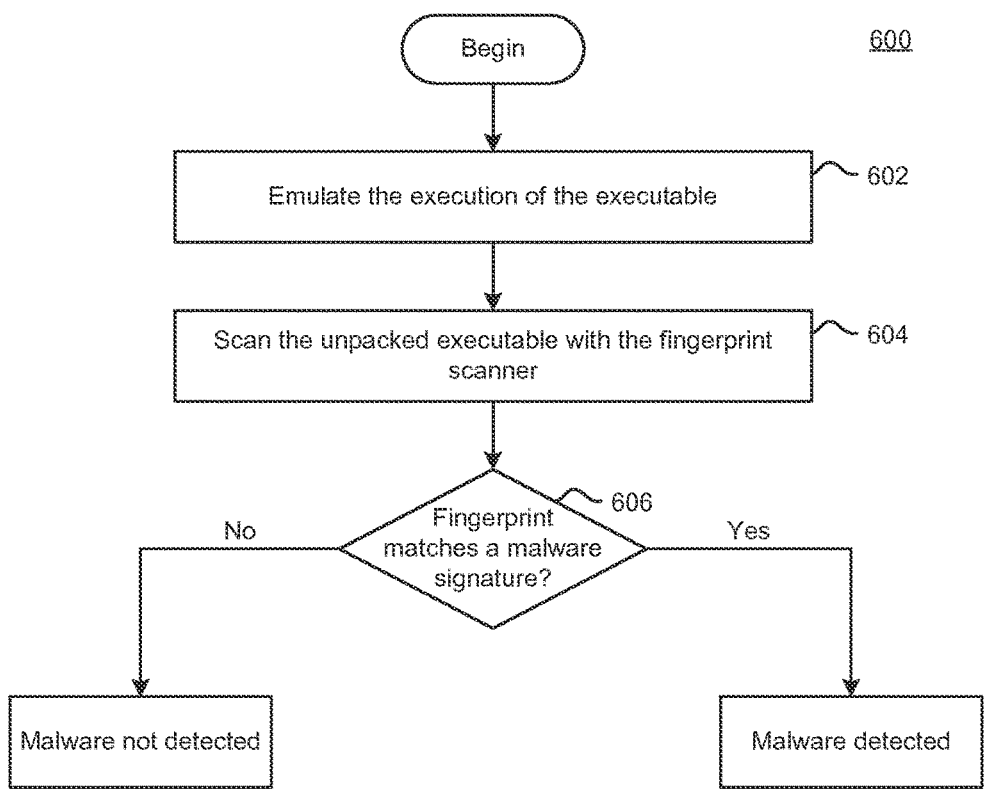
FIG. 6 illustrates a method of further analyzing the executables flagged as potentially containing malware, according to one embodiment.

FIG. 6 illustrates a method 600 for confirming the presence of malware in the executables potentially containing malware found in method 500. The method begins at step 602 by emulating the execution of one of the executables potentially containing malware up to a second count of instructions. In one embodiment, the execution of the executable is emulated up to the second count of instructions in the synthetic emulator. Partially emulating the execution of the executable by executing the execution of the executable up to the second count of instructions increases the performance regulations of the anti-virus method. In another embodiment, the executable is executed on the CPU. When the executable is executed on the CPU, the execution is monitored so that any potential malware does not store itself in memory.

At step 604, the scanner scans the unpacked executable while emulating the execution of the executable up to the second count of instructions. As noted, a fingerprint is generated in a manner such that the fingerprint uniquely identifies the file. To scan for malware, the fingerprint scanner tests fingerprints created for the file and compares the retrieved fingerprints to the stored malware signature definitions in the system scanner. Each malware signature describes a known type of malware. If a fingerprint matches a signature, it signifies that the file is infected with the malware described by the signature. In response to determining that the file is infected by malware, the fingerprint scanner remediates the file. By using multiple fingerprints associated with the file to scan the file for malware, the malware can be detected by the fingerprint scanner using a signature even if the malware has mutated to a state where it no longer corresponds to the signature. A fingerprint can detect mutated malware because the malware's signature may still correspond to one of the file's fingerprints. If it is determined that the file is infected with malware, the fingerprint scanner transmits fingerprints of the file to the CPU for analysis of the malware and its mutations.

At step 606, the fingerprint scanner looks for malware in the executable. If the fingerprint scanner finds malware, then the fingerprint scanner detects malware in the executable at step 608. If malware is detected, the executable may be quarantined so it does not create any harm. If the fingerprint scanner does not find a malware signature, then the fingerprint scanner did not detect any malware in the executable at step 610.

Figure 7:
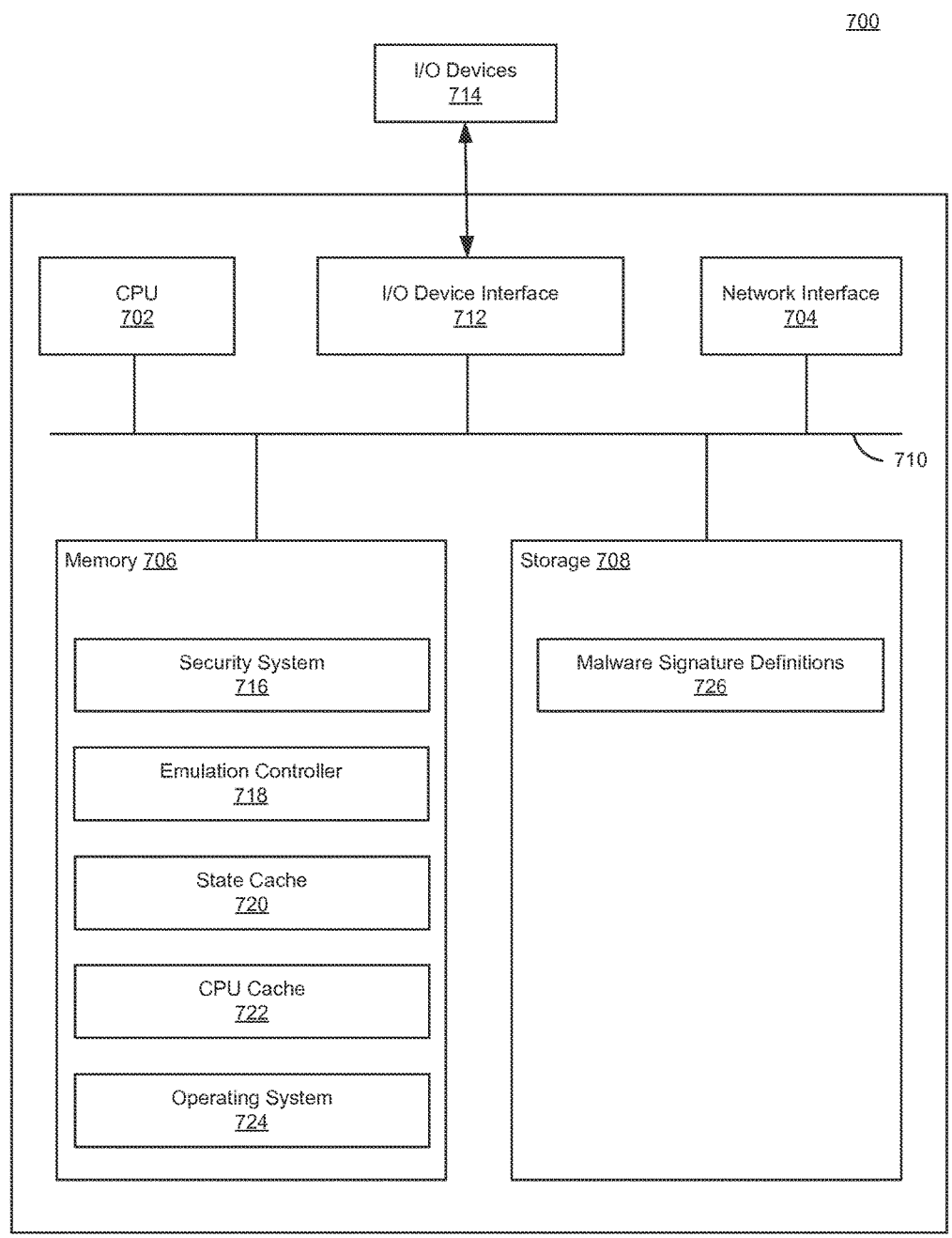
FIG. 7 illustrates an example of a computing server, according to one embodiment.

FIG. 7 illustrates an example of a computing system 700, according to one embodiment. As shown, the computing system 700 includes a central processing unit (CPU) 702, a network interface 704, a memory 706, and storage 708, each connected to a bus 710. The computing system 700 also includes an I/O device interface 712 connection I/O devices 714 (e.g., keyboard, display, and mouse devices) to the computing system 700. Further, in context of this disclosure, the computing elements shown in the computing system 700 may correspond to a physical computing system (e.g., a system in a data center) or may be a virtual computing instance when executing within a computing cloud.

The CPU 702 retrieves and executes programming instructions stored in the memory 706 as well as stores and retrieves application data residing in the memory 706. The bus 710 is used to transmit programming instructions and application data between the CPU 702, I/O devices interface 712, storage 708, network interface 704, and memory 706. Note, CPU 702 is included to be representative of a single CPU, multiple CPUs, a single CPU having multiple processing cores, and the like. And the memory 706 is generally included to be representative of a random access memory. The storage 708 may be a disk drive storage device. Although shown as a single unit, the storage 708 may be a combination of fixed and/or removable storage devices, such as fixed disc drives, removable memory cards, optical storage, network attached storage (NAS), or a storage-area-network (SAN).

Illustratively, the programs stored in the memory 706 may include, but are not limited to, a detection component 716, an emulation controller 718, a state cache 720, a CPU cache 722, and an operating system 724. Among other functions, the emulation controller 718 determines when to halt the emulation of a file and begin scanning for viral signatures. Malware signature definitions 726 may be stored in the storage 708.

The detection component 716 uses the state cache 720 to determine if a file had previously been determined to not contain malware so that emulation may be terminated early. Further, the detection component 716 uses the CPU cache 722 to count the number of cache misses during emulation.

Generally, if a processor finds a memory location that is in the cache, a cache hit has occurred. However, if the processor does not find the memory location in the cache, a cache miss occurs.

As described, embodiments presented herein provide methods for detecting whether application in a computing network have been compromised by malware. In one embodiment, the execution of the executable is emulated. The number of cache misses during emulation is counted. The number of cache misses counted during emulation is compared to a predetermined threshold. If the executable falls within the threshold, the executable is identified as potentially containing malware. The execution of the executables potentially containing malware may be further emulated to confirm a presence of malware contained in the executable.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether a particular advantage is achieved by a given embodiment is not limiting of the invention. Thus, the following aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered an element or limitation of the appended claims except where explicitly recited in a claim.

Aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus, or device.

The flowchart and block diagrams in the Figures illustrate the architecture, functionality, and operation of possible implementations of systems, methods, and computer program products according to various embodiments of the present invention. In this regard, each block in the flowchart or bloc diagrams may represent a module, segment, or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for detecting malware in an executable, the method comprising:
   receiving an executable to evaluate for malware;
   executing the executable up to a first count of instructions,
   determining a number of cache misses that occur while executing the executable up to the first count of instructions;
   comparing the number of cache misses to a threshold, wherein the threshold corresponds to an expected number of cache misses occurring when executing a program containing junk instructions; and
   upon determining the number of cache misses exceeds the threshold, identifying the executable as potentially containing malware based at least on the number of cache misses.

2. The method of claim 1, further comprising:
   upon determining the number of cache misses exceeds the threshold:
      executing the executable up to a second count of instructions; and
      scanning for the presence of a malware fingerprint generated while executing the executable up to the second count of instructions.

3. The method of claim 1, further comprising, scanning for the presence of a malware fingerprint generated while executing the executable up to the first count of instructions.

4. The method of claim 1, wherein executing the executable comprises:
   emulating the execution of the executable with a synthetic emulator.

5. The method of claim 1, wherein executing the executable comprises:
   executing the executable on a CPU while monitoring the execution.

6. The method of claim 1, wherein the executable is a packed executable containing malware and junk instructions that is decompressed and restored in memory when executed.

7. The method of claim 1, wherein determining the threshold comprises:

emulating an execution of a second executable, wherein the second executable does not include junk instructions; and counting a number of cache misses while emulating the execution of the second executable.

8. The method of claim 7, wherein determining the threshold further comprises:

emulating an execution of an third executable, wherein the third executable includes junk instructions;

counting a number of cache misses while emulating the execution of the third executable; and comparing the number of cache misses to the number of cache misses counted during the emulation of the execution of the executable that does not include junk instructions.

9. A system, comprising:

a processor; and a memory storing program code, which, when executed on the processor performs an operation for detecting malware in a packed executable, the operation comprising:

receiving an executable to evaluate for malware, executing the executable up to a first count of instructions, determining a number of cache misses that occur while executing the executable up to the first count of instructions, comparing the number of cache misses to a threshold, wherein the threshold corresponds to an expected number of cache misses occurring when executing a program containing junk instructions, and upon determining the number of cache misses exceeds the threshold, identifying the executable as potentially containing malware based at least on the number of cache.

10. The system of claim 9, wherein the operation further comprises:

upon determining the number of cache misses exceeds the threshold:

executing the executable up to a second count of instructions; and scanning for the presence of a malware fingerprint generated while executing the executable up to the second count of instructions.

11. The system of claim 9, comprising, wherein the operation further comprises, scanning for the presence of a malware fingerprint generated while emulating the execution of the executable up to the first count of instructions.

12. The system of claim 9, wherein executing the executable comprises:

emulating an execution of the executable with a synthetic emulator.

13. The system of claim 9, wherein executing the executable comprises:

executing the executable on a CPU while monitoring the execution.

14. The system of claim 9, wherein the executable is a packed executable containing malware and junk instructions that is decompressed and restored in memory when executed.

15. The system of claim 9, wherein determining the threshold comprises:

emulating an execution of a second executable, wherein the second executable does not include junk instructions; and counting a number of cache misses while emulating the execution of the second executable.

16. The system of claim 15, wherein determining the threshold further comprises:

emulating an execution of a third executable that does include junk instructions;

counting a number of cache misses while emulating the execution of the third executable; and comparing the number of cache misses to the number of cache misses counted while emulating the execution of the second executable that does not include junk instructions.

17. A non-transitory computer readable storage medium having stored thereon instructions that when executed by a processor cause the processor to perform an operation for detecting malware in a packed executable, the operation comprising:

receiving an executable to evaluate for malware;

executing the executable up to a first count of instructions, determining a number of cache misses that occur while executing the executable up to the first count of instructions;

comparing the number of cache misses to a threshold, wherein the threshold corresponds to an expected number of cache misses occurring when executing a program containing junk instructions; and upon determining the number of cache misses exceeds the threshold, identifying the executable as potentially containing malware based at least on the number of cache misses.

18. The non-transitory computer readable storage medium of claim 17, wherein the operation further comprises:

upon determining the number of cache misses exceeds the threshold:

executing the executable up to a second count of instructions; and scanning for the presence of a malware fingerprint generated while executing the executable up to the second count of instructions.

19. The non-transitory computer readable storage medium of claim 17, wherein the operation further comprises, scanning for the presence of a malware fingerprint generated while executing the executable up to the first count of instructions.

20. The non-transitory computer readable storage medium of claim 17, wherein executing the executable comprises:

emulating an execution of the executable with a synthetic emulator.

* * * * *